US005991805A

United States Patent [19]

Krukovsky

[11] Patent Number: 5,991,805

[45] Date of Patent: Nov. 23, 1999

[54] PORTABLE UNIVERSAL VIDEO/AUDIO COMPUTER TESTER

[76] Inventor: Yuri Krukovsky, 43 St. Mark'sPl. #6D, New York City, N.Y. 10003

[21] Appl. No.: 08/682,989

[22] Filed: Jul. 16, 1996

[51] Int. Cl.[6] .................................................... G06F 17/00

[52] U.S. Cl. .................................................... 709/223

[58] Field of Search .......................... 395/200.11, 183.22, 395/183.2; 348/189, 185; 371/20.1, 22.6, 21.1

[56] References Cited

U.S. PATENT DOCUMENTS

| | | | |
|---|---|---|---|
| 4,348,761 | 9/1982 | Berger | 371/21.1 |
| 4,794,599 | 12/1988 | Purcell et al. | 371/21.1 |
| 4,837,488 | 6/1989 | Donahue | 379/21 |
| 4,837,764 | 6/1989 | Russello | 395/183.22 |
| 4,843,620 | 6/1989 | Hagedorn | 324/66 |
| 5,357,519 | 10/1994 | Martin et al. | 364/551.01 |
| 5,440,339 | 8/1995 | Harrison et al. | 348/189 |
| 5,583,874 | 12/1996 | Smith et al. | 371/20.1 |

OTHER PUBLICATIONS

"Diagnosing PC Faults Using a Power on Self Test Card"; Electronics on the Web Issue#1. Jun. 9, 1996.

"Model 801GC–ISA Video Test Generator Plug–in Card" http://www.quantumndata.com/htlmdocs/gcisa_ds.html, Jul. 30, 1996.

"Dacqpod 12A Series" http://www.siliconsoft.com/dachard2.htm, 1995.

*Primary Examiner*—Ellis B. Ramirez

*Attorney, Agent, or Firm*—Robert W.J. Usher

[57] ABSTRACT

A portable, universal video and audio computer tester has a video section including a pluggable video connector for connecting to an external source of a video signal; a video detector for detecting an input RGB video signal; a video indicator for signaling presence of an input RGB video signal; a synch detector for detecting an input video synchronization signal; and, synch indicating means for signaling presence of a and input horizontal and a vertical synchronization signal. An audio section has pluggable audio connectors; an internal audio generator for creating an output audio signal; an audio indicator for signaling presence of an input audio signal from the external source or from the internal audio generator; a switch for changing an operational mode from an input audio signal to an output audio signal. Connection to either an external or internal power supply is provided. Operations of video computer interfaces and audio computer interfaces can be verified by connection to the video connector and to the audio connector, respectively.

14 Claims, 2 Drawing Sheets

PORTABLE UNIVERSAL VIDEO/AUDIO COMPUTER TESTER

FIELD OF THE INVENTION

The invention relates to the field of computer servicing and troubleshooting and, in particular, to portable computer signal testers.

BACKGROUND OF THE INVENTION

A large number of service personnel is currently working in the computer field service industry. Field service engineers are, in their daily work routines, required to identify the exact part of malfunctioning computer equipment. But, at the present time, they are not fully equipped to do it in the most efficient and reliable way.

For example, when identifying video interface problems such as a blank screen of a computer monitor, missing colors or unsynchronized picture, a technician must decide which part of computer is defective—a video card or the monitor. The most common way is to check the monitor by replacing it with a properly functioning one from a nearby work station. However, this is a time consuming and cumbersome operation which causes downtime for the other system. In addition a compatible monitor is not always immediately available for the test. This is especially true when diagnosing the cause of failure of the LCD display of a single laptop computer owned by an individual computer operator.

In such cases, the technician should use an oscilloscope, but such device is not readily available either, because it cannot usually be part of the field engineer's repair kit because of its weight, dimensions and cost. As a result, the technician is usually forced to make a guess based on his previous experience, and is frequently wrong, resulting in wasted time, high cost of repair and a dissatisfied customer.

The same approach is normally taken by technicians when diagnosing problems in audio equipment by replacing audio cards, audio cables, loudspeakers and microphones in multimedia computer systems. The same wrong conclusion could be made if the spare units are not available at the time of test.

Various signal testers are widely known and most of them are related to the telephone and communication systems. However, no portable, simple, cheap and universal device which could be used for identifying defective parts of video/audio interfaces of any computer system is available.

For example, U.S. Pat. No. 4,837,488 issued Jan. 6, 1989 to Donahue teaches a portable identifier and tester unit which identifies corresponding computer cable ends. However, this tester is limited in application only to the evaluation of the continuity of the cable lines and does not have the capability of testing the video/audio computer interfaces.

Another type of tester is taught by U.S. Pat. No. 4,843,620 issued Jan. 27, 1989 to Hagedorn. The patent describes a hand-held telephone line signaling tester for signal measuring in telephone lines. The device is dedicated to test specific telephone systems, has a complex design with a key pad and LCD display and cannot be used for computer interface testing.

In addition, other testers and apparatus relate mostly to telephone systems and there is no prior art of the video/audio tester device for use in computer interface testing.

SUMMARY OF THE INVENTION

An object of the present invention is to provide a computer signal tester, which can be used to diagnose failures in computer video and audio interfaces in a more reliable and efficient way.

Another object of the present invention is to provide a multipurpose computer signal tester, which can be used universally with any type of computer system for video and audio signal testing.

A further object of the present invention is to provide a portable, hand-held computer signal tester, which can be easily carried by a field service engineer for on-site testing.

Yet another object of the present invention is to provide a simple and cheap computer signal tester which can be easily manufactured using inexpensive and well known components of video electronic circuitry.

According to one aspect of the present invention there is provided a portable, universal video computer tester comprising video connection means for connecting to the source of a video signal, a video detection means connected to the video connection means for detecting the input RGB video signal, a video indicating means connected to the video detection means for signaling the presence of the input RGB video signal, synch detection means connected to the video connection means for detecting the presence of the input video synchronization signal and synch indicating means connected to the synch detection means for indicating the presence of the horizontal and vertical synchronization signal.

According to another aspect of the present invention, there is provided a portable, universal audio computer tester comprising audio connection means for connecting to the source of an audio signal, audio generating means for creating the source of an output audio signal, audio indicating means connected to the audio connection means for signaling the presence of the input and output audio signal and switching means connected between the audio connection means and the audio generating means for changing the operational mode of the device from the input audio signal to the output audio signal.

According to an additional aspect of the present invention, there is provided a portable, universal video/audio computer tester comprising video connection means for connecting to the source of a video signal, video detection means connected to the video connection means for detecting the input RGB video signal, video indicating means connected to the video detection means for signaling the presence of the input RGB video signal, synch detection means connected to the video connection means for detecting an input video synchronization signal, synch indicating mean connected to the synch detection means for signaling the presence of horizontal and vertical synchronization signal, audio connection means for connecting to the source of an audio signal, audio generating means for creating the source of an output audio signal, audio indicating means connected to the audio connection means for signaling the presence of the input and output audio signal and switching means connected between the audio connection means and audio generating means for changing the operational mode of the device from the input audio signal to the output audio signal.

In the preferred embodiment of the invention, the synch detection means may comprise a horizontal and vertical selector of the synch-on-green composite synchronization signal and further comprise the horizontal and vertical selector of composite synchronization signal for work with different computer systems.

Video connection means may comprise two separate IBM and Apple type pluggable connectors which both are connected to a common video test circuitry of the device.

Audio connection means of the device may comprise two male and female connectors for connecting to the source of the input audio signal and they can be switched to the internal source of the output audio signal.

The device of the present invention can operate using an on-board battery or an independent source of DC current.

The present invention solves the aforementioned problems of on-site servicing of the computer equipment. The compact, hand-held device is a simple, lightweight unitary structure which can be part of the field engineer's test and repair kit and easily carried to service location.

On-site, to isolate the video interface failures the technician can simply disconnect the video cable of the computer monitor, plug the tester into the video port or video card of the computer and test presence of the RGB video signal and horizontal and vertical synch. Complete indication of the presence of all components of output computer signal clearly identifies the problem as being with the computer monitor. In other case, absence of one of the RGB signal or horizontal and vertical synch can be observed on the screen of a working computer monitor as a picture in which the color is missing or which is unsynchronized horizontally or vertically.

In monitors where the high voltage is applied to the CRT only when the horizontal synch is present, absence of such signal will result in a blank screen.

The present invention is a multipurpose device which can test video signal of the IBM or Apple computers with standard separate horizontal and vertical synch, composite synch or synch-on-green composite systems.

Thus, the ability of the present invention to enable fast identification of the presence of all components of the video signal affords an effective alternative solution to using an oscilloscope or another monitor as a test unit to isolate the video problems.

When it is necessary to isolate the audio interface failures in multimedia computer systems, the technician can simply disconnect an audio cable from the computer and plug the device into an audio card to detect the presence of an output audio signal. In a case where the signal is present, the audio cable can be tested by connecting it between the audio card output and the device input. Additional female audio connector of the device can provide more flexibility in testing audio cards, audio cables and different peripheral audio devices.

To test the peripheral audio devices such as a loudspeaker or microphone the present device can be utilized as an audio signal generator, having its output audio signal switched to the same audio connectors, which were used to receive an input audio signal from the audio card.

In this case the output audio signal from the device can be used to test a free-standing loudspeakers, microphone audio amplifiers and built-in audio amplifier and loudspeakers of the multimedia computer monitor as well as all of their connecting audio cables.

Thus, the introduction of the present invention to computer field service industry can provide numerous on-site service personnel with an effective, multipurpose device which can considerably improve the efficiency and quality of the computer field service.

DESCRIPTION OF THE PREFERRED EMBODIMENT

Figure 1:
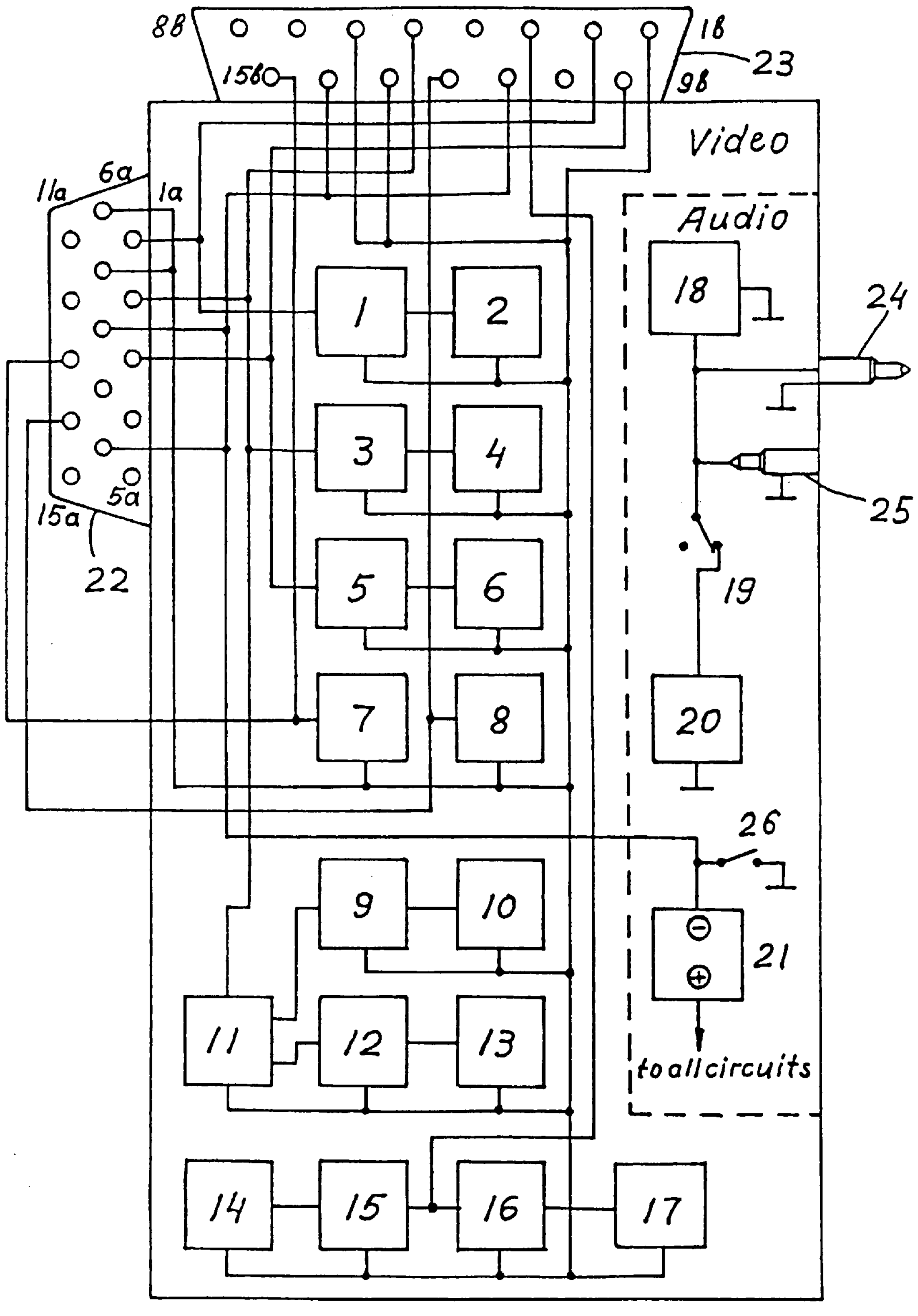
FIG. 1 is a block circuit diagram of a preferred embodiment of a portable universal video/audio computer tester according to the invention.

As shown in the FIG. 1, the portable universal video/audio computer tester of the preferred embodiment of the present invention consists of two sections—video and audio. The tester has four connectors of different design to be used with different video/audio computer systems.

The video connector 22 is an IBM 15-pin mini D-Sub connector compatible with all IBM type computers. The video connector 23 is an Apple 15-pin D-Sub connector compatible with all Apple type computers.

As shown in the block circuit diagram of FIG. 1, the IBM and Apple type video connectors 22 and 23 are connected to common video test circuitry of the device.

For example, the RGB input video signal from pins 1*a*, 2*a*, 3*a* of the 15-pin mini D-Sub IBM connector 22 is fed to the video detection means 1,3,5 of the device in the same way as the RGB input video signal from pins 2*b*, 5*b*, 9*b* of the 15-pin D-Sub Apple connector 23.

Similarly, the horizontal and vertical video synchronization signal from pins 13*a*, 14*a* of the IBM connector is fed to the synch indicating means 7,8 of the device in the same way as the horizontal and vertical video synchronization signal from pins 15*b*,12*b* of the Apple connector.

In addition, for computer systems with synch-on-green video signal there is a selector 11 of the synch-on-green composite horizontal and vertical synchronization signal connected to pin 5*b* of the Apple connector. The selector 11 separates the synch signal from the video Green signal and feeds the composite synch to the horizontal and vertical synch selectors 9,12 accordingly. The outputs of the selectors 9,12 are connected to the corresponding horizontal and vertical synch indicating circuits 10 and 13.

For computer systems having separate composite horizontal and vertical synch, the signal from pin 3*b* of the Apple connector is fed to the horizontal synch selector 15 and vertical synch selector 16.

The outputs of the selectors 15 and 16 are connected to the corresponding horizontal and vertical synch indicating circuits 14 and 17.

The audio part of the computer tester of the present invention comprises two audio connectors 24 and 25 which are the standard audio plug and audio socket compatible with most audio cards and peripheral devices of multimedia computers. Connectors 24,25 are connected to the audio indicating circuit 18 which can signal the presence of the input audio signal from an external source or the output audio signal from the audio generator 20 of the device. The switch 19 provides the possibility for the audio part of the tester to work with an input audio signal or the output audio signal from the generator 20.

The computer tester can work with an independent source of DC or can operate from an internal battery, as shown.

The (+) terminal of the battery is connected directly to the entire circuitry of the tester. The (–) terminal of the battery is connected to the ground of the audio part of the device through "Audio on-off" switch 22.

Numerous ground pins of the IBM and Apple video connectors enable the (–) terminal of the battery to be connected to all video circuitry of the tester through the ground of the external devices so excluding the necessity of an additional "Video on" switch.

As shown in the FIG. 1, the (–) terminal of the battery is connected to ground pins 8*a*, 10*a*, of the IBM connector and ground pins 11*b*,14*b* of the Apple connector. All (−) terminals of the video circuitry of the device are connected to the ground pins 6*a*,7*a* of the IBM connector and ground pins 1*b*, 6*b*, 13*b* of the Apple connector.

When the tester is connected to an external device, for example, by the IBM connector, the connection of the (−) terminal of the battery—through pins 8*a*, 10*a*—and the ground of the external device and back—through pins 6*a*,7*a*—of the same connector, is completed with all (−) terminals of the video circuitry. In the same way, the (−) terminal of the battery is connected to all (−) terminals of the video circuitry when the tester is connected to the external device by the Apple connector.

Thus, the act of plugging the tester into any video system will automatically power on its internal video circuitry, in the same way testing the presence of the computer ground connections.

The video/audio computer tester of the present invention can be easily manufactured. Conventional, widely known video electronic circuitry can be utilized in the construction of the device. For example, RGB video detection means (1,3,5) could be a simple threshold amplifier with one or two transistors connected to indicating means (2,4,6) comprising an emitter follower with an LED.

The horizontal and vertical synch indicating means (7,8) could be a simple rectifier with an LED.

The standard composite synch or synch-on-green selectors utilized in all types of computer monitors could be used in the synch selector circuitry (9,11,12,15,16) of the invention. For particular use in the tester of the present invention they could be a simple variation of the RC filters and limiters. Again, the synch indicating means (10,13,14,17) could be an LED.

The audio indicating means (18) of the audio part of the present device could be a rectifier with an LED or a miniature loudspeaker.

The audio generating means (20) can be a simple pulse oscillator requiring only a few components and a couple of transistors.

Thus, the video/audio computer tester may utilize proven, mass produced components of video circuitry, assuring portability, reliability and economy in high volume, mass production.

Figure 2:
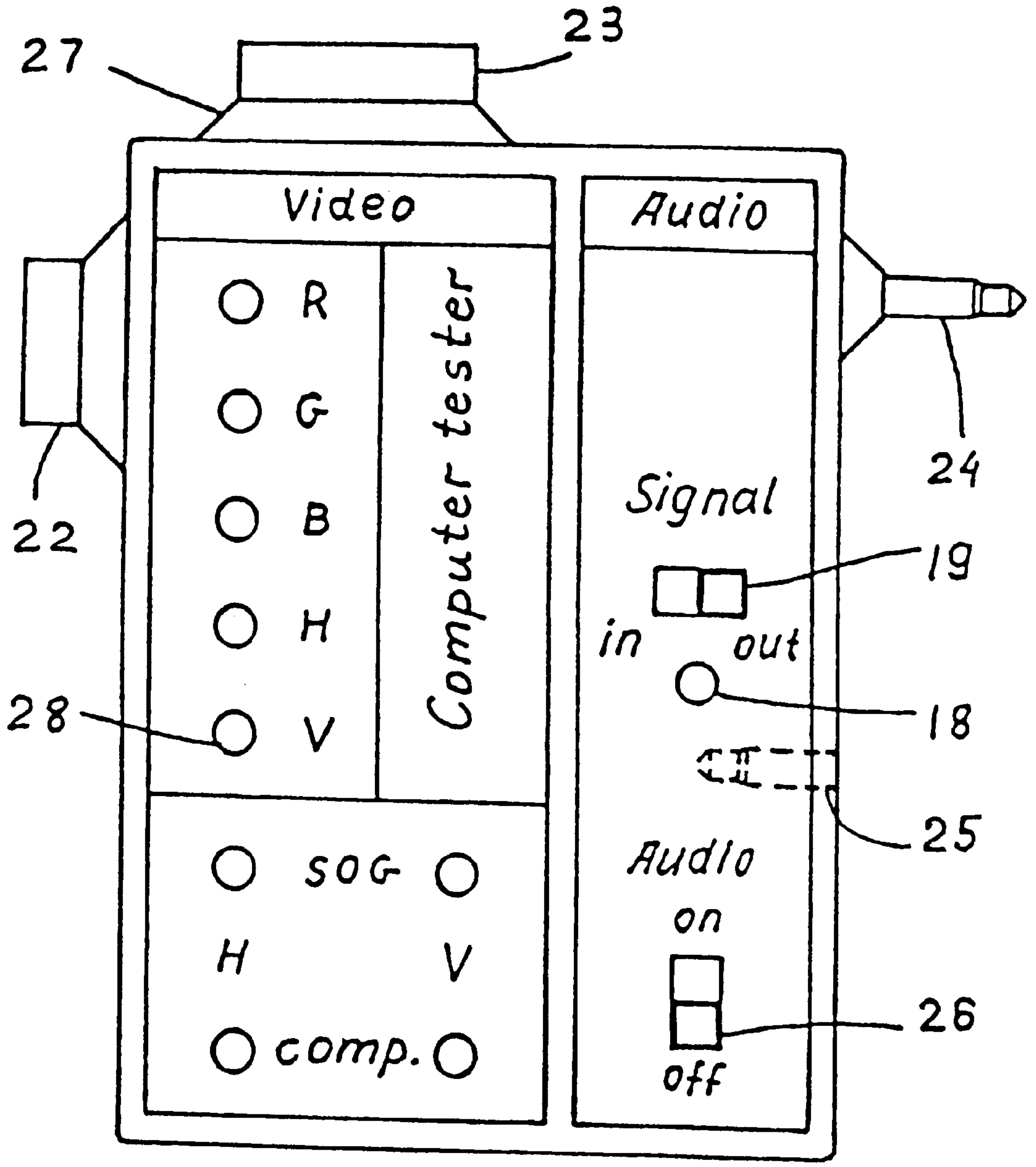
FIG. 2 is a front panel view of the device of the present invention.

As shown in the FIG. 2, the preferred embodiment of the present invention is a compact, portable device comprising two functional sections—video and audio—within a unitary, rectanguloid housing. The two video connectors 22,23 and the audio connector 24 are mounted on respective pedestals 27 on respective adjacent faces providing easier mating with computer video/audio ports. The second audio connector 25 is a standard audio socket. On the front panel of the device, video and audio LED indicators 28 signal the presence of all components of the video signal and the audio signal.

Switch 19 switches the operational mode of the audio section of the tester from the input audio signal to the output audio signal. Switch 26 activates the audio tester.

I claim:

1. A portable, analog, video computer tester for testing a video computer interface, having a unitary housing and comprising:

directy pluggable video connection means providing cable-free connection to an external source of a video signal;

video detection means connected to the video connection means for detecting separate components of a RGB video signal input into the connection means;

video indicating means connected to the video detection means for signaling presence of separate components of a RGB video signal detected by the video detection means;

synch test circuit means connected to the video connection means for testing and indicating presence of separate components of a video synchronization signal input into the connection means; and, means for connecting to one ot an external power supply and an internal power supply, so that operation of a video computer interface can be verified by connection thereof to the video connection means.

2. A portable, analog, audio computer tester for testing an audio computer interface and peripheral audio devices, having a unitary housing and comprising:

directly pluggable audio connection means providing cable-free connection to a source of an audio signal;

internal audio generating means for creating an output audio signal;

audio indicating means connected to the audio connection means for signaling presence of an audio signal input to the connection means from one of the external source and the internal generating means;

means connected to the audio connection means and the audio generating means for changing an operational mode thereof from an input audio signal to an output audio signal; and, means for connecting to one of an external power supply and an internal power supply, so that operation of an audio computer interface can be verified by connection thereof to the audio connection means.

3. A portable, analog, video and audio computer tester for testing video and audio computer interface and audio peripheral devices, having a unitary housing and comprising:

directly pluggable video connection means providing cable-free connection to an external source of a video signal;

video detection means connected to the video connection means for detecting separate components of a RGB video signal input into the connection means;

video indicating means connected to the video detection means for signaling presence of separate components of a RGB video signal detected by the video detection means; synch test circuit means connected to the video connection means for testing and indicating presence of separate components of a video synchronization signal input into the connection means; and, directly pluggable audio connection means providing cable-free connection to a source of an audio signal;

internal audio generating means for creating an output audio signal;

audio indicating means connected to the audio connection means for signaling presence of an audio signal input to the connection means from one of the external source and the internal generating means;

means connected to the audio connection means and the audio generating means for changing an operational mode thereof from an input audio signal to an output audio signal; and, means for connecting to one of an external power supply and an internal power supply, so that respective operations of video computer interfaces and audio computer interfaces can be verified by connection thereof to the video connection means and to the audio connection means, respectively.

4. A portable tester according to claim 1 wherein the synch test circuit means further comprises a horizontal and vertical selector of a synch-on-green composite synchronization signal and a horizontal and vertical selector of a composite synchronization signal and a synch indicating means for signaling presence of a horizontal and a vertical synchronization signal.

5. A portable tester according to claim 3 wherein the synch test circuit means further comprises a horizontal and vertical selector of a synch-on-green composite synchronization signal and a horizontal and vertical selector of a composite synchronization signal and a synch indicating means for signaling presence of a horizontal and a vertical synchronization signal.

6. A tester according to claim 1 wherein the video connection means includes standard IBM and Apple connectors connected to common video test circuitry.

7. A tester according to claim 3 wherein the video connection means includes standard IBM and Apple connectors connected to common video test circuitry.

8. A tester according to claim 2 wherein the audio connection means includes a standard audio plug and audio socket connected to common audio test circuitry.

9. A tester according to claim 3 wherein the audio connection means includes a standard audio plug and audio socket connected to common audio test circuitry.

10. A tester according to claim 6 wherein video circuitry is powered on through ground pins of the video connectors and a ground of the external device.

11. A tester according to claim 7 wherein video circuitry is powered on through ground pins of the video connectors and a ground of the external device.

12. A portable tester according to claim 1 wherein the video indicating means and the synch test circuit means for indicating presence of separate components of a video synchronization signal comprise respective LED.

13. A portable tester according to claim 3 wherein the video indicating means and the synch test circuit means for indicating presence of separate components of a video synchronization signal comprise respective LED.

14. A portable tester according to claim 2 wherein the audio indicating means comprises a LED.

* * * * *